US011883357B2

(12) United States Patent
Godlieb et al.

(10) Patent No.: US 11,883,357 B2
(45) Date of Patent: Jan. 30, 2024

(54) MASSAGING DEVICE

(71) Applicant: KONINKLIJKE PHILIPS N.V., Eindhoven (NL)

(72) Inventors: Robert Godlieb, Eindhoven (NL); Michel Van Es, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1053 days.

(21) Appl. No.: 16/088,644

(22) PCT Filed: Mar. 30, 2017

(86) PCT No.: PCT/EP2017/057477
§ 371 (c)(1),
(2) Date: Sep. 26, 2018

(87) PCT Pub. No.: WO2017/167840
PCT Pub. Date: Oct. 5, 2017

(65) Prior Publication Data

US 2019/0117494 A1 Apr. 25, 2019

(30) Foreign Application Priority Data

Mar. 30, 2016 (EP) .................................... 16162812

(51) Int. Cl.
*A61H 7/00* (2006.01)
*A61H 15/00* (2006.01)

(52) U.S. Cl.
CPC ............. *A61H 7/003* (2013.01); *A61H 7/004* (2013.01); *A61H 7/005* (2013.01); *A61H 15/0085* (2013.01); *A61H 2015/0007* (2013.01); *A61H 2201/0107* (2013.01); *A61H 2201/1215* (2013.01); *A61H 2201/1223* (2013.01); *A61H 2201/1253* (2013.01); *A61H 2201/1671* (2013.01); *A61H 2201/1692* (2013.01)

(58) Field of Classification Search
CPC ........ A61H 7/002; A61H 7/003; A61H 7/004; A61H 7/005; A61H 7/007
See application file for complete search history.

(56) References Cited

U.S. PATENT DOCUMENTS

| | | | |
|---|---|---|---|
| 1,623,124 | A | 4/1927 | Charles |
| 2,706,980 | A | 4/1955 | Rudolph |
| 2,867,211 | A | 1/1959 | Hughes |
| 4,633,858 | A | 1/1987 | Rutsch |

(Continued)

FOREIGN PATENT DOCUMENTS

| | | | |
|---|---|---|---|
| CN | 2734213 | Y | 10/2005 |
| DE | 4116836 | A1 | 11/1992 |

(Continued)

*Primary Examiner* — LaToya M Louis

(57) ABSTRACT

A massaging device (100) with a massaging surface and a plurality of massaging elements (101, 102, 103) moveable relative to each other; characterized in that the massaging surface is adapted such that when applying the massaging surface to a skin surface (111) and moving the massaging elements (101, 102, 103) relative to each other, two differently directed forces are simultaneously exercised by the massaging elements (101, 102, 103) on the skin surface (111) thereby causing simultaneous pinching and stretching of the skin surface (111) present in between the massaging elements (101, 102, 103).

20 Claims, 8 Drawing Sheets

(56) References Cited

U.S. PATENT DOCUMENTS

| | | | | |
|---|---|---|---|---|
| 6,760,946 | B2 * | 7/2004 | DePuydt .............. | A61C 15/047 15/22.1 |
| 7,762,966 | B1 | 7/2010 | Gaines | |
| 8,740,917 | B2 | 6/2014 | Pilcher | |
| 9,237,981 | B1 | 1/2016 | Clementes | |
| 2010/0042025 | A1 | 2/2010 | Wu | |
| 2013/0015229 | A1 | 6/2013 | Mizuno | |
| 2014/0202493 | A1 * | 7/2014 | Zelickson .............. | A61B 17/32 134/6 |
| 2015/0107016 | A1 | 4/2015 | Mizuno | |

FOREIGN PATENT DOCUMENTS

| | | | |
|---|---|---|---|
| DE | 202008008992 | U1 | 9/2008 |
| FR | 2902318 | A1 | 12/2007 |

* cited by examiner

MASSAGING DEVICE

This application is the U.S. National Phase application under 35 U.S.C. § 371 of International Application No. PCT/EP2017/057477, filed on Mar. 30, 2017, which claims the benefit of International Application No. 16162812.8 filed on Mar. 30, 2016. These applications are hereby incorporated by reference herein.

FIELD OF THE INVENTION

The present invention relates to devices for massaging skin. In particular, the invention relates to handheld massaging devices.

BACKGROUND OF THE INVENTION

US2010/042025 describes an abdomen massaging apparatus which includes a gear unit, a drive motor unit, a toothed rack unit, and a sliding track unit. The toothed rack unit includes a plurality of elongated toothed racks which are arranged in a radiating manner, a plurality of roller gears each meshing with a respective one of the toothed racks and each having a central mandrel, and a plurality of rolls each mounted on the central mandrel of a respective one of the roller gears. The sliding track unit includes a successive channel to allow passage of the central mandrel of each of the roller gears. Thus, the rolls are movable along the toothed racks of the toothed rack unit reciprocally and simultaneously so as to provide a massaging effect to a user.

U.S. Pat. No. 1,623,124 describes a scalp treating apparatus comprising a group of fingers, a second group being disposed between the fingers of the first, and means for causing relative movement between the groups.

DE202008008992 describes an electrical massaging device for massaging the muscles with a plurality of rollers.

U.S. Pat. No. 7,762,966 describes a massaging mattress assembly for massaging various parts of a user's body while lying down. The massaging mattress assembly includes a mattress that has a top, a head end, and a plurality of slots that are spacedly disposed in the top. A headrest assembly is removably attached to the head end of the mattress. A roller assembly is disposed in the slots of the mattress. The roller assembly includes base members that are disposed in the slots and also includes ball members upon which a user lies. A vibrating assembly is disposed in said mattress.

U.S. Pat. No. 2,706,980 describes a scalp massage implement having a plurality of relatively stationary fingers and a plurality of movable finger, spaced from one another yet so close together as to all bear simultaneously against a part only of a human scalp of normal size.

FR2902318 describes a device with a plurality of rollers.

U.S. Pat. No. 9,237,981 describes a therapeutic massage device, specifically a manual scalp massager that can both provide a soothing sensation to the user and also stimulate the sebaceous glands and hair follicles of a person's scalp.

SUMMARY OF THE INVENTION

Manual as well as electric powered handheld massaging appliances exist. These devices have a varying level of effectiveness and usability. Many appliances sold have small or minor vibratory motions that are perhaps pleasant but have little to no effect on the skin. Appliances that do massage and interact with the skin in an effective way to realize, for example, an anti-wrinkle effect on the collagen layer or a blood-flow stimulation on the dermis have a higher force-load on the skin. From this there are also loads generated on the skin that do not directly contribute to the beneficial function, but do stress the skin and consume power. Additionally an overall net-load may be caused on the skin that makes handling more difficult. With devices that include counteracting massaging surfaces, these make the appliance cumbersome and the equal pressing down onto the skin becomes essential for control.

There is a need for a handheld skin massaging tool that, 1) effectively massages the skin, 2) is a power efficient device and 3) is a device that is easy to handle by the user while massaging the skin.

In a first aspect of the invention, a massaging device is presented. The device has a massaging surface comprising a plurality of massaging elements moveable relative to each other. The massaging surface is adapted such that when applying the massaging surface to a skin surface and moving the massaging elements relative to each other, at least two differently directed forces are simultaneously exercised by the massaging elements on the skin surface thereby causing simultaneous pinching and stretching of the skin surface present in between the massaging elements.

According to an embodiment of the invention, a net-result of the two differently directed forces exercised on the skin surface is about zero. According to an embodiment of the invention, the at least two differently directed forces are directed opposite to each other.

According to an embodiment of the invention, the plurality of massaging elements comprises at least first, a second and a third massaging element. The second massaging element may be located in between the first and the third massaging element. The second massaging element is moveable relative to the first and the third massaging element.

According to an embodiment of the invention, the first and the third massaging elements are fixed on a first plate. The second massaging element is fixed on a second plate. The first plate is positioned on top of the second plate. The second massaging element protrudes the first plate via a through-hole present in the first plate and located in between the first and the third massaging element. The first plate is moveable relative to the second plate or vice versa.

According to an embodiment of the invention, the first and the third massaging elements are fixed on a second plate. The second massaging element is fixed on a first plate. The first plate is positioned on top of the second plate. The first and the third massaging elements protrude the first plate via through-holes present in the first plate, the location of the through-holes being aligned with the location of the first and the third massaging elements. The first plate is moveable relative to the second plate or vice versa. For example, the first plate is rotationally moveable relative to the second plate or vice versa.

According to an embodiment of the invention, dimensions of the through-hole and the second massaging element are selected or adapted to restrict movement of the second massaging element within the through-hole to a back and forward motion. In other words, the through-holes are dimensioned to allow the motion of the plates relative to each other.

According to another embodiment of the invention, dimensions of the through-hole and the second massaging element are adapted to allow an arcuate or circular movement of the second massaging element within the through-hole.

According to another embodiment of the invention, the first or the second plate is fixed inside the massaging device. The movement of the plurality of massaging elements relative to each other is caused by moving the massaging elements located on the moveable plate relative to the massaging elements located on the fixed plate.

According to another embodiment of the invention, the first and/or the second plate are moveable inside the massaging device. The movement of the plurality of massaging elements relative to each other may be caused by moving both plates relative to each other or by moving one of the plates relative to the other one.

According to an embodiment, the massaging device comprises a mechanical system configured for rotationally moving the plates relative to each other. The mechanical system may be a system configured to translate a rotational motion to a motion suitable for moving the plates relative to each other. For example, the suitable motion may be a back-and forward motion or an alternating clock-wise/anti-clockwise motion.

According to an embodiment of the invention, the massaging device comprises a means for moving the plurality of massaging element relative to each other. The means for moving the plurality of massaging element relative to each may be a motor. The means for moving the plurality of massaging element relative to each may also be a handle for manually handling the massaging device.

According to an embodiment of the invention, the means for moving the plurality of massaging element relative to each other is attached to the massaging device via a resilient material. The resilient material is adapted to be flexible in one direction and resilient in other directions.

According to an embodiment of the invention, the means for moving the plurality of massaging element relative to each other is attached to the massaging device via mechanical linkages. By doing so, a net-force on the means for moving the plurality of massaging element relative to each other is reduced when actuating the massaging device.

According to an embodiment of invention, at least a part of the massaging elements are individually displaceable. At least a part of the massaging elements may be displaced individually by a means for individually driving the massaging elements. For example, all massaging elements are individually driven to achieve displacement of elements and create the desired massaging effect. For example, at least a part or all of the massaging elements comprise an electric motor for individually displacing the massaging elements. The motors may be coupled and driven by a processor. The processor may be configured to drive the motors such that the massaging elements are displaced according to a certain pattern, e.g. chosen by the user, to create the desired massaging effect via simultaneous pinching and stretching of the skin.

According to an embodiment of the invention, the massaging device further comprises piezoelectric elements configured for moving the plurality of massaging elements relative to each other. For example, a plurality of piezoelectric elements may be present that drive different massaging elements of the massaging device and achieve the simultaneous pinch and stretch effect on different areas of the skin as described throughout this specification. For example, each massaging device may comprise such a piezoelectric element. The ensemble of piezoelectric elements may be coupled to a processor configured for driving the piezoelectric elements.

According to an embodiment of the invention, the massaging device comprises two or more concentric circles of massaging elements. The massaging elements in each concentric circle are adapted such that moving these elements relative to each other creates at least two differently directed forces on the skin resulting in a massaging effect. Also, the net-result of the forces exercised on the skin is substantially zero.

In a second aspect of the invention, a hand-held device comprising a massaging device as described in the first aspect of the invention is presented. The hand-held device may be a shaving or depilation device. The massaging device as described in the first aspect of the invention may be click-on device which can be attached to the hand-held device which accommodates the attachment of the click-on device.

According to a particular embodiment of the invention, the massaging device is comprised in a scalp-massaging device. In such an embodiment, the shape of the massaging surface is adapted or adaptable to the shape of the scalp of an individual. Because the net-result of the forces exercised on the scalp is about zero, the massaging device can be placed on the scalp and easily held in place. The massaging device may for example be integrated in a helmet which can be worn by an individual.

According to another embodiment, the massaging device is comprised in a device for massaging the skin of the face.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
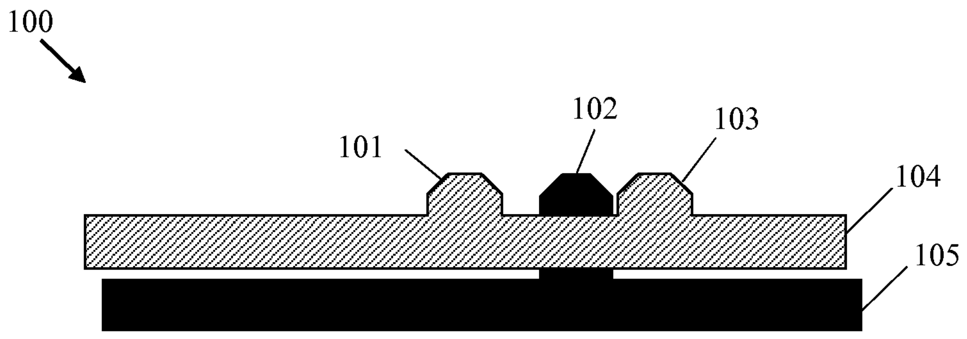
FIG. 1 illustrates an embodiment of the massaging device

Any reference signs in the claims shall not be construed as limiting the scope.

In the different drawings, the same reference signs refer to the same or analogous elements.

DETAILED DESCRIPTION OF THE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention solves the problems as described above by providing a device having a massaging surface comprising a plurality of massaging elements or studs. The massaging elements are arranged as a first and a second set of massaging elements, both sets being distributed among each other. The first set of massaging elements is a fixed set of massaging elements. The second set of massaging elements is a fixed set of massaging elements. When moving the different sets of massaging elements relative to each other and applying the massaging surface a skin surface, the movement of the sets of massaging elements causes the skin to simultaneously pinch and stretch. Because of this simultaneous pinching and stretching of the skin, the massaging force is contained within the massaged area. With the forces onto the skin being localized, there is only the massaging load on the skin and no external net-load to stress the skin or interfere with the ease of handling the device. This makes the device extremely easy to handle while still achieving a good massaging effect on the skin. Also, because the massaging force is contained within the massaged area, power consumption is reduced leading to, for example, better battery life for handheld devices.

DETAILED EMBODIMENTS OF THE INVENTION ARE DESCRIBED BELOW

FIG. 1 illustrates an embodiment of the massaging device 100. Illustrated are a first 101, a second 102 and a third 103 massaging element. The first 101 and the third 103 massaging element are located on a first plate 104. The second massaging element 102 is located on a second plate 105. The first plate 104 is positioned on top of the second plate 105. The first plate 104 is moveable relative to the second plate 105. For example, the first plate 104 is moveable and the second plate 105 is fixed. Alternatively, the second plate 105 is moveable and the first plate 104 is fixed. Alternatively, the first plate 104 and the second plate 105 are moveable. The first plate 104 features a through-hole (not shown). The through-hole in the first plate 104 is positioned such that the second massaging element 102 penetrates the through-hole and protrudes the through-hole when the first plate 104 is positioned on top of the second plate 105.

Alternatively, the second massaging element 102 is located on a first plate 104. The first 101 and the third 103 massaging element are located on a second plate 105. The first plate 104 is positioned on top of the second plate 105. The first plate 104 is moveable relative to the second plate 105. For example, the first plate 104 is moveable and the second plate 105 is fixed. Alternatively, the second plate 105 is moveable and the first plate 104 is fixed. Alternatively, the first plate 104 and the second plate 105 are moveable. The first plate 104 features at least two through-holes (not shown). The through-holes in the first plate 104 are positioned such that the first 101 and the third 103 massaging element each penetrate a different through-hole and protrudes the through-holes when the first plate 104 is positioned on top of the second plate 105.

According to an embodiment of the invention, the massaging device comprises a piezoelectric element for moving a massaging element. For example, in FIG. 1, the second massaging element 102 may comprise a piezoelectric element. This allows the second massaging element 102 to be moved relative to the first 101 and third 103 massaging element. The piezoelectric element may be located underneath the second massaging element 102. The piezoelectric element may also be integrated in the second plate 105 at the location where the second massaging element is fixed to the second plate 105.

According to an embodiment of the invention, the massaging elements and the plate to which they are fixed are fabricated from a single piece of material. The massaging elements may be created by removing material from the material, for example through a milling process. Alternatively, the massaging elements and the plate may be fabricated via a single molding process. Alternatively, the massaging elements are mounted on a plate, for example bolted.

According to an embodiment of the invention, the massaging elements are fabricated from a material that has a substantial grip on skin when applied to it. For example, the massaging elements are fabricated from an elastic material such as rubber. The massaging elements may also be covered by such an elastic material. For example, the massaging elements are metal studs covered by an elastic material.

According to another embodiment of the invention, at least some of the massaging elements are fabricated from or covered with an abrasive material. The abrasive material may comprise abrasive particles fabricated from corundum (aluminum oxide), sodium bicarbonate, magnesium oxide, silicone carbide, or sapphire, or the like. These particles may be of a size ranging from about 50 to 300 grit, typically about 100 to 120 grit. In such an embodiment, the device may be used as an exfoliating ("scrubbing"), (micro)dermabrasion or grinding device to treat the skin, e.g. for callous removal. While in this description reference is made to massaging elements, in embodiments for removing one or more layers of the skin these massaging elements may be referred to as "dermabrasion elements" or "skin layer removal elements".

According to an embodiment of the invention, the massaging device is a portable, handheld massaging device.

According to an embodiment of the invention, the massaging elements may be pillars or studs. The massaging elements may have any shape suitable for massaging the skin. For example, the massaging elements may be shaped as a cone, a dome, a pyramid, a cube, a torus, a cylinder.

According to an embodiment of the invention, the distance between adjacent massaging elements on a plate may be between 5 to 25 mm. In a particular embodiment, the distance between advancement massaging elements on the same plate is 10 mm.

Figure 2:
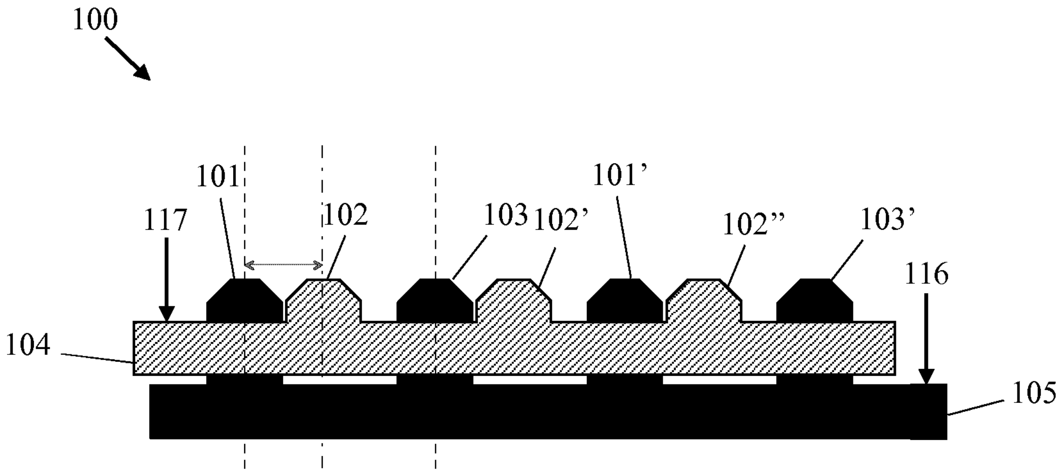
FIG. 2 illustrates an embodiment of the massaging device

FIG. 2 illustrates an embodiment of the massaging device 100. A first plate 104 and a second plate 105 are illustrated. The first plate 104 comprises a first set of massaging elements 102, 102', 102" that are fixed on the plate. The first set of massaging elements 102, 102', 102" are located on a top surface 117 of the first plate 104. The second plate 105 comprises a second set of massaging elements 101, 103, 101', 103'. The second set of massaging elements 101, 103, 101', 103' are located and fixed on the top surface 116 of the second plate 105. The first plate 104 comprises a plurality of through-holes which are aligned with the position of the second set of massaging elements 101, 103, 101', 103' such that when the first plate 104 is positioned on top of the second plate 105 the second set of massaging elements 101, 103, 101', 103' protrude the through-holes. This allows the first plate 104 to be positioned on top of the second plate 105. The plurality of through-holes of the first plate 104 are distributed among the first set of massaging elements 102, 102', 102". The first plate 104 is positioned on the top surface 116 of the second plate 105, the first set of massaging elements 102, 102', 102" facing away from that top surface 116. The first and second set of massaging elements form a massaging surface.

Figure 3:
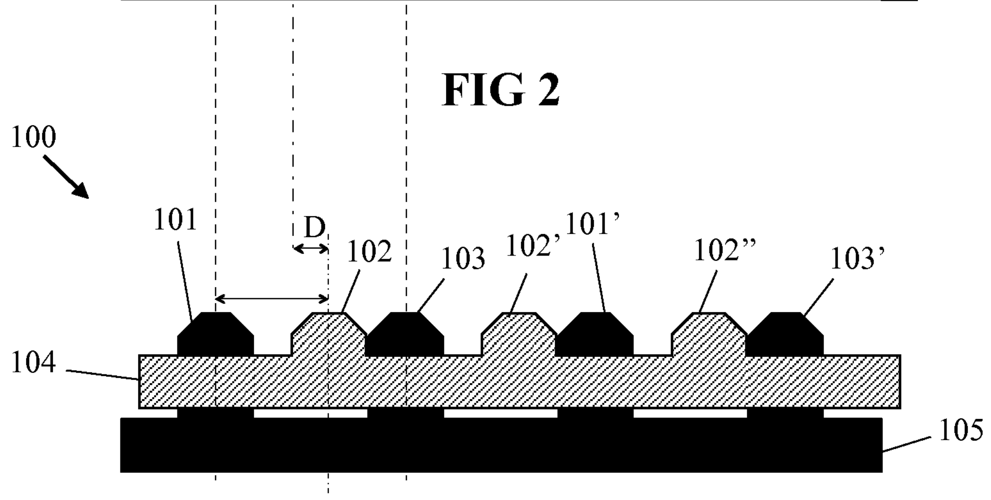
FIG. 3 illustrates an embodiment of the massaging device

FIG. 2 and FIG. 3 illustrate the situation where the first plate 104 and the second plate 105 are moved relative to each other, over a distance D. In a preferred embodiment, distance D equals the lowest motion that will generate the massage into the desired depth into the skin.

In a first stage, the device as illustrated in FIG. 2 is placed against a skin surface. In a second stage and as illustrated in FIG. 3, the first plate 104 and the second plate 105 are moved relative to each other. While doing so, the second massaging element 102 moves away from the first massaging element 101 and approaches the third massaging element 103. The effect of this is that the movement of the first 101 and second 102 massaging elements away from each other has a stretching effect on the skin present underneath the first 101 and the second 102 massaging element. At the same time, the second massaging element 102 moves closer to the third massaging element 103. This movement has a pinching effect on the skin present underneath the second 102 and the third 103 massaging element.

Thus, a simultaneous pinching and stretching effect on the skin is caused by the simultaneous application of differently directed forces on the skin. Because of the simultaneous application, the net-force on the user handling the device is substantially zero. This makes the device extremely easy to handle by the user and allows it to be implemented in a portable handheld massaging device.

In other words, the force exerted on the skin, tangential to the skin, of the massaging elements of the first plate is approximately equal and in opposite direction to the force exerted by the massaging elements of the second plate. Having that force evenly created by the several massaging elements makes the net-force on the skin and on the handling approximately zero.

According to an embodiment the first and/or the second plates are circular. This allows an easy integration in a handheld massaging device. In such an embodiment, the movement of the plates relative to each other may be rotational.

Figure 4:
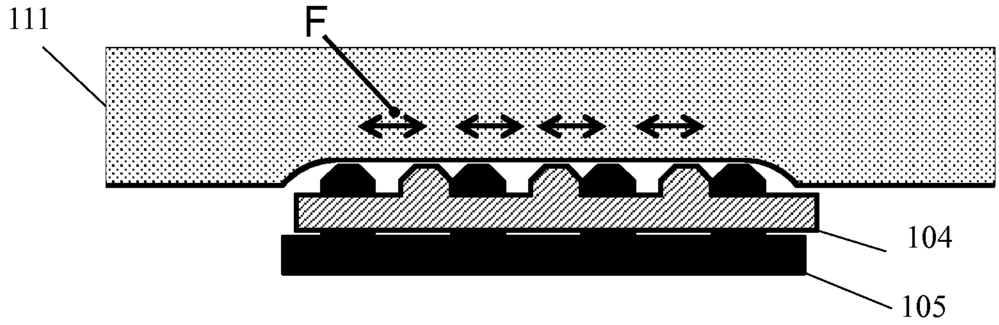
FIG. 4 illustrates an embodiment of the massaging device applied to a skin surface

According to an embodiment of the invention, one or both plates are made from a flexible material, for example a rubber. This allows the plates to conform to the contours of the skin when applied or pressed against the skin. The flexibility can also be achieved through a mechanical construction of the plates. For example, the plates may be segmented whereby the different segments are able to conform to the shape of the skin. As illustrated in FIG. 4, the skin surface 111 that is in contact with the massaging surface experiences simultaneous pinching and stretching effects. A plurality of skin surface areas are exposed to these simultaneous pinching and stretching forces resulting in a pleasant massaging effect which can be easily applied by the user on the skin because of the net-force on the user being substantially zero.

Figure 5:
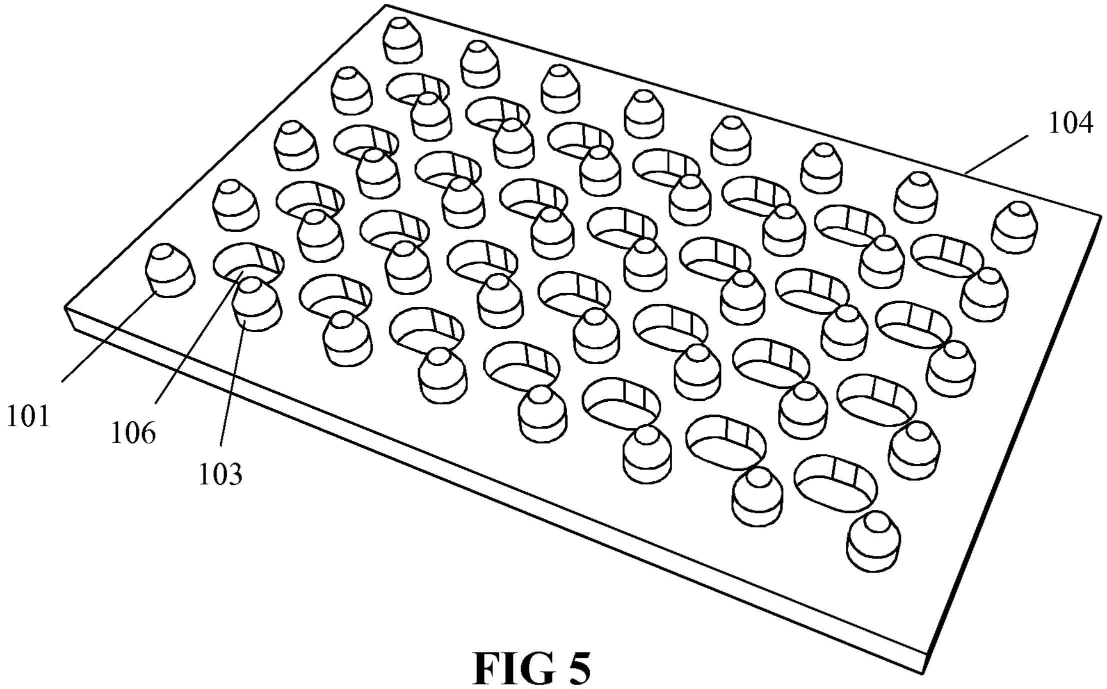
FIG. 5 illustrates a part of an embodiment of the massaging device

FIG. 5 illustrates an embodiment of the first plate 104. The plate 104 comprises a plurality of massaging elements 101, 103. The plate 104 comprises plurality of through-holes 106. The through-holes are holes that completely penetrate the plate 104. The massaging elements are distributed over the surface of the plate 104, in rows or columns. The through-holes are distributed over the surface of the plate 104, in rows or columns. Rows or columns of through-holes 106 are located in between rows or columns of massaging elements 101, 103. Each row or column of through-holes is located in between two rows or columns of massaging elements.

Figure 6:
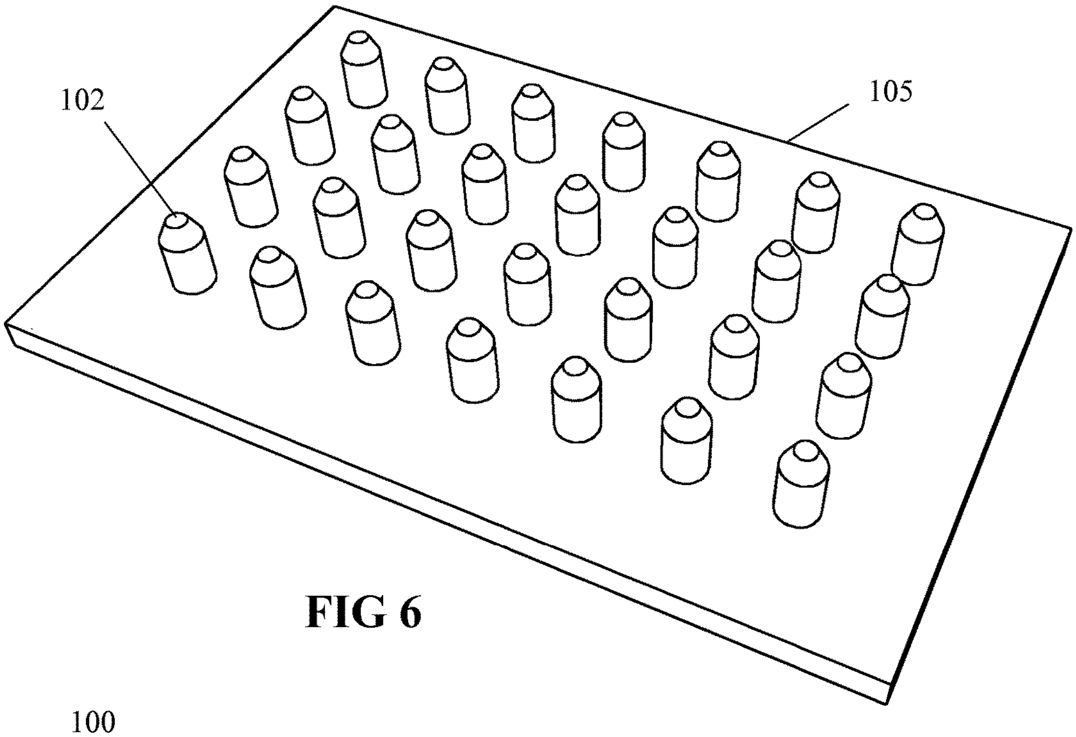
FIG. 6 illustrates a part of an embodiment of the massaging device

FIG. 6 illustrates a second plate 105. The plate 105 comprises a plurality of massaging elements 102. The locations of the massaging elements 102 on the second plate 105 are aligned with the location of the through-holes 106 in the first plate 104 such that the first 104 and second 105 plate can be placed on top of each other and interlock. The massaging elements 102 penetrate the first plate 104 while doing so and eventually protrude from the first plate 104 as illustrated in FIG. 7.

Figure 7:
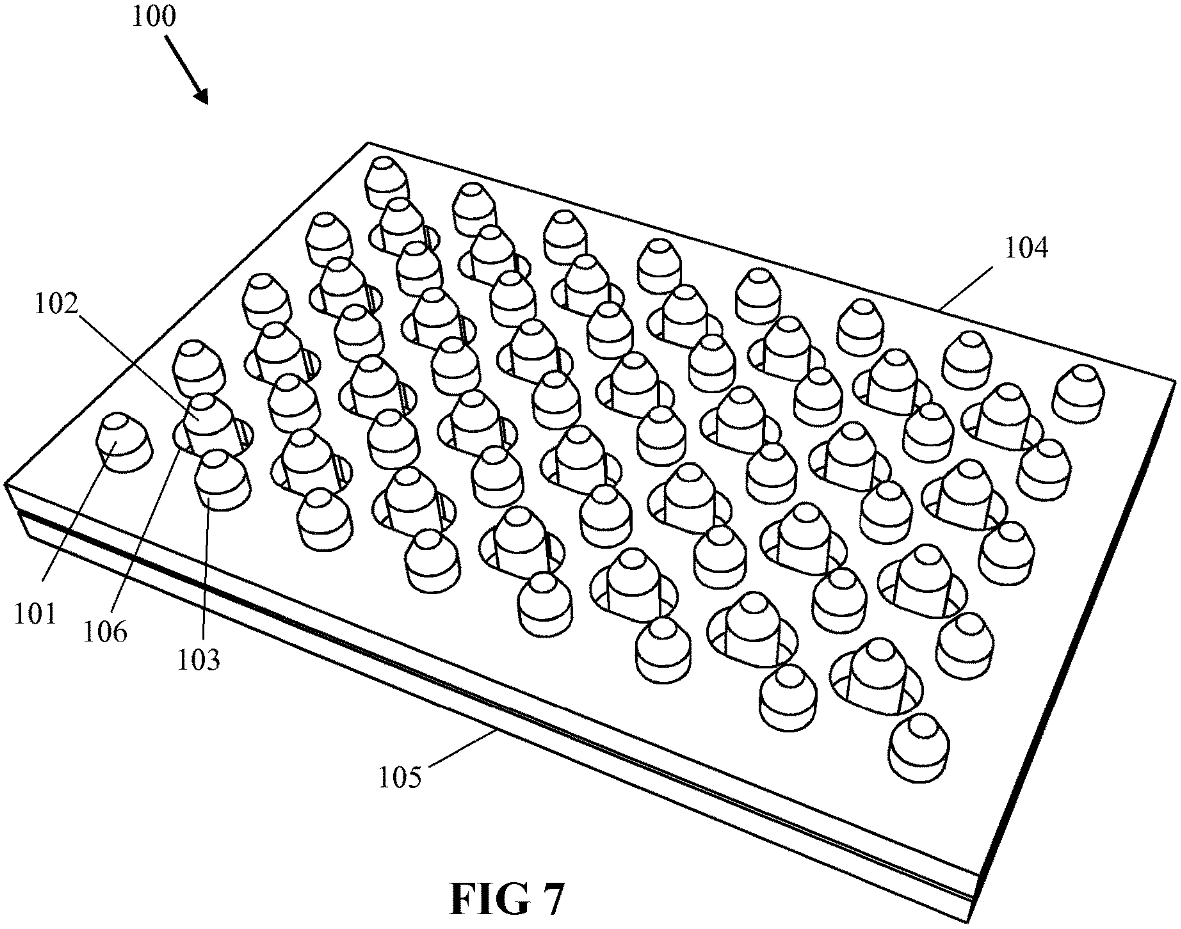
FIG. 7 illustrates a massaging surface according to an embodiment of the massaging device

FIG. 7 illustrates the first plate 104 being positioned on top of the second plate 105. The massaging elements of the first 104 and the second plate 105 thereby forming a massaging surface of massaging elements 101, 102, 103 from the first 104 and the second plate 105. To realize this, the height of the massaging elements 102 on the second plate 105 may be about the sum of the thickness of the first plate 104 and the height of the massaging elements 101, 103 of the first plate 104. This way, when positioning the first plate 104 on top of the second plate 105, an even massaging surface comprising massaging elements 101, 102, 103 of the first 104 and the second plate 105 is realized.

Figure 8:
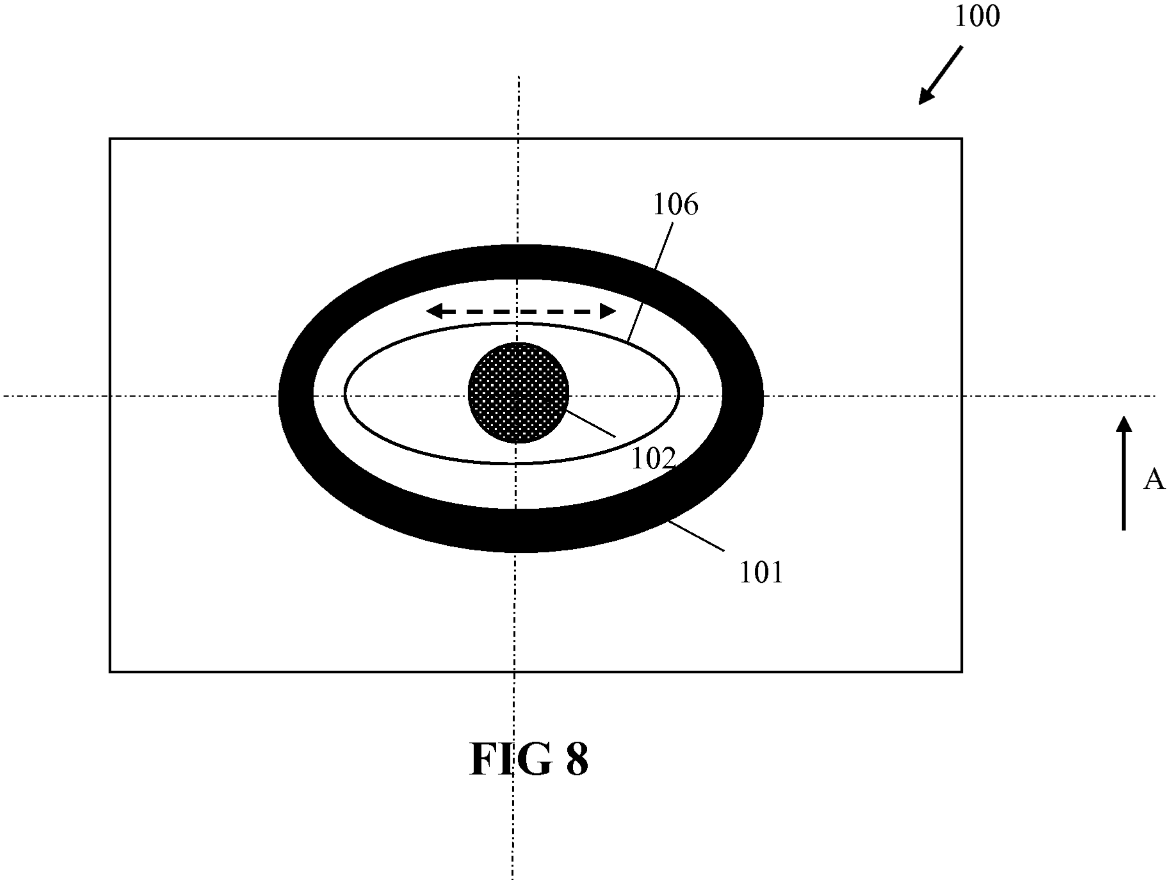
FIG. 8 illustrates an embodiment of the massaging device

FIG. 8 illustrates a massaging device 100 comprising a first massaging element 101. The first massaging element 101 is an open and hollow structure. The surface of the first massaging element may be ring or oval shaped. For example, the first massaging element 101 may be a torus, e.g. an oblong torus. Within the first massaging element 101 a second massaging element 102 is present that can move relative to the first massaging element 101. The second massaging element 102 protrudes through a through-hole 106 that is present within the first massaging element 101. When the massaging element is placed against the skin and the massaging elements 101, 102 are moved relative to each other, the skin experiences a simultaneous pinch and stretch effect as explained above. Thus, in such an embodiment, the massaging surface comprises a surface having a plurality of open hollow structures, wherein each open hollow structure features a moveable massaging element present inside the open hollow structure.

Figure 9:
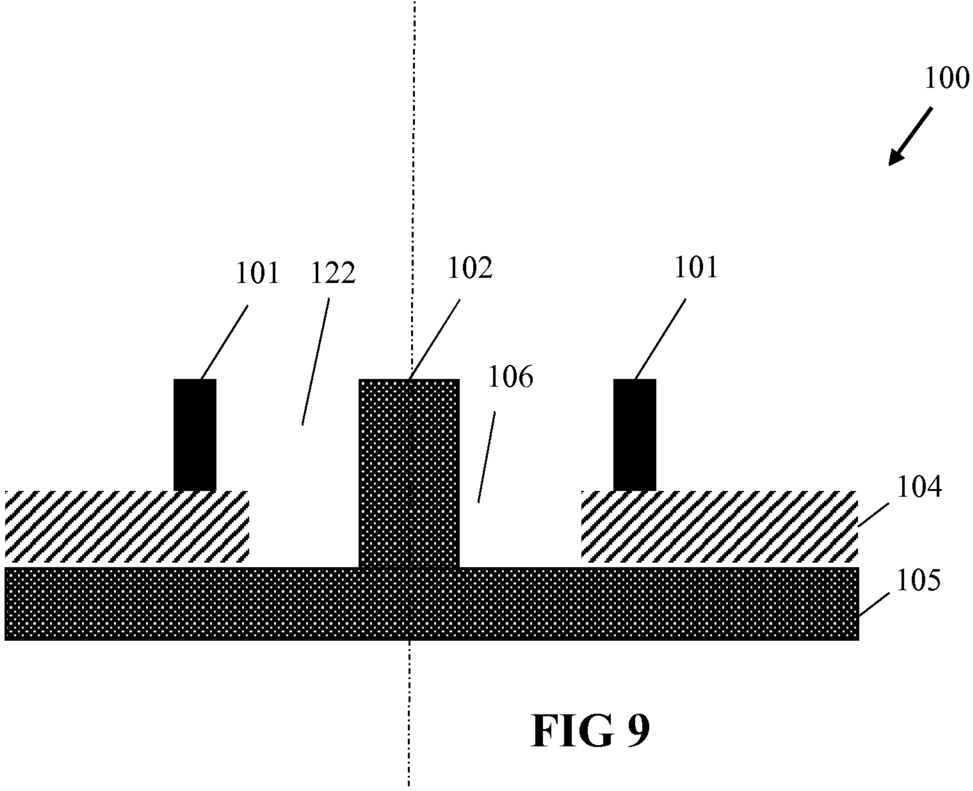
FIG. 9 illustrates a cross section of the embodiment illustrated in FIG. 8

FIG. 9 illustrates a cross section of FIG. 8. The first massaging element 101 is located on a first plate 104. The part of the plate present in the space 122 within the first massaging element 101 features a through-hole 106. A massaging element 102 which is located on a second plate 105 protrudes through the through-hole 106. The first plate 104 is located on top of the second plate 105. By moving the plates 104, 105 relative to each other, the second massaging element 102 moves within the through-hole 106 and causes a simultaneous pinching and stretching effect when applied to the skin. Thus, in such an embodiment the massaging device 100 comprises a first plate 104 with open hollow structures 101 having a through-hole 106 in each open hollow structure 101. The first plate 104 is positioned on top of a second plate 105 comprising massaging elements 102 of which the position on the second plate 105 is aligned with the through-holes 106 in the first plate 104.

Figure 10:
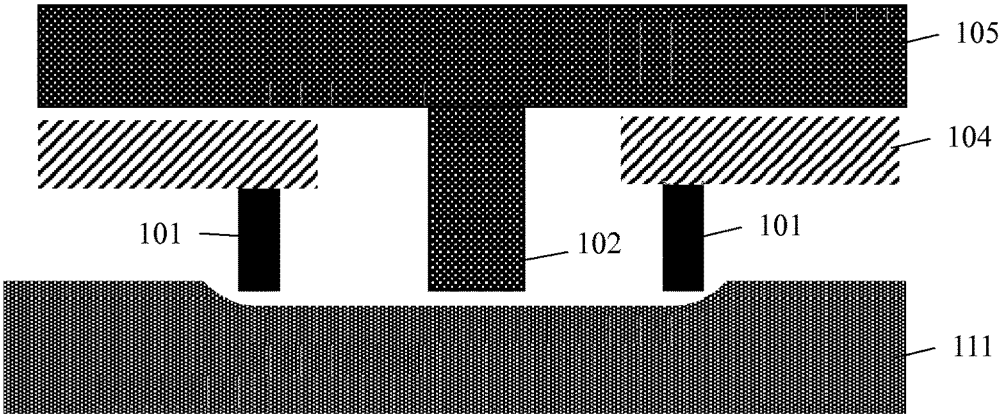
FIG. 10 illustrates the embodiment of the invention applied to a skin surface
Figure 11:
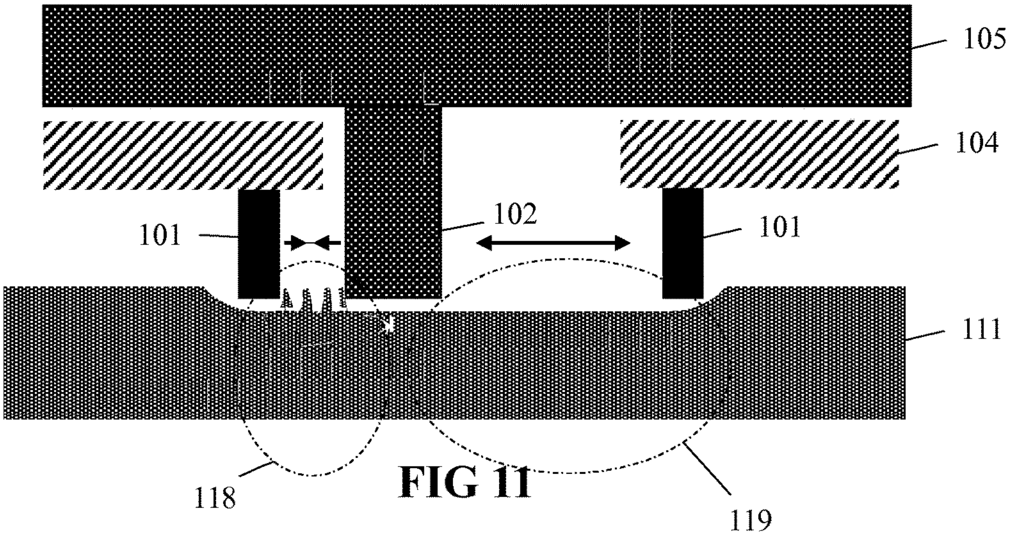
FIG. 11 illustrates the effect of the relative movement of massaging element of an embodiment of the invention to a skin surface
Figure 12:
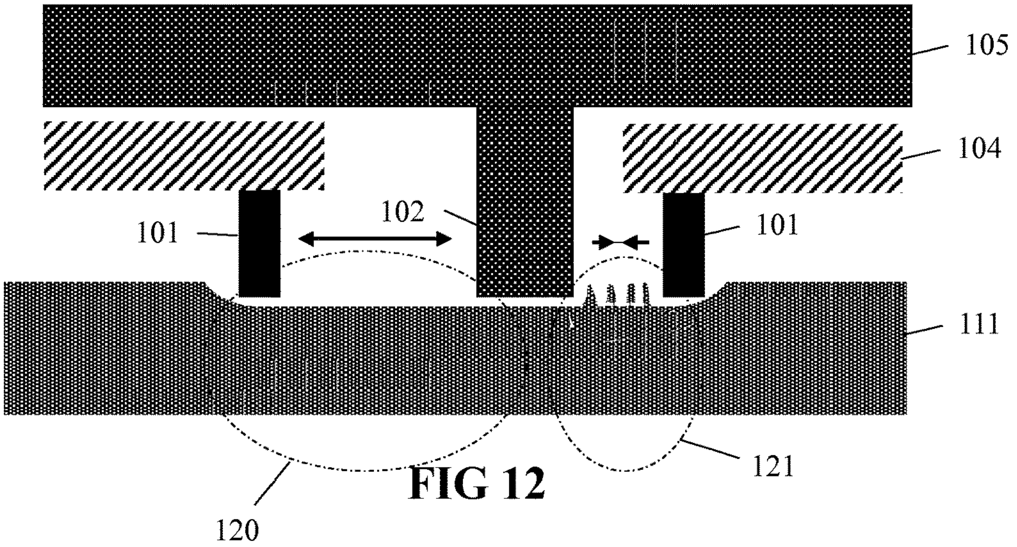
FIG. 12 illustrates the effect of the relative movement of massaging element of an embodiment of the invention to a skin surface

FIG. 10 illustrates a massaging device as also illustrated in FIG. 8 and FIG. 9. The first 101 and the second 102 massaging elements are applied to a skin surface 111. FIG. 11 illustrates skin region 118 being pinched by the relative movement of the massaging elements 101, 102. Also, while skin region 118 is pinched, simultaneously, skin region 119 is stretched. Thus, two simultaneous and differently directed forces are applied to skin surface 111. FIG. 12 illustrates skin region 121 being pinched by the relative movement of the massaging elements 101, 102. Also, while skin region 121 is pinched, simultaneously, skin region 120 is stretched.

Figure 13:
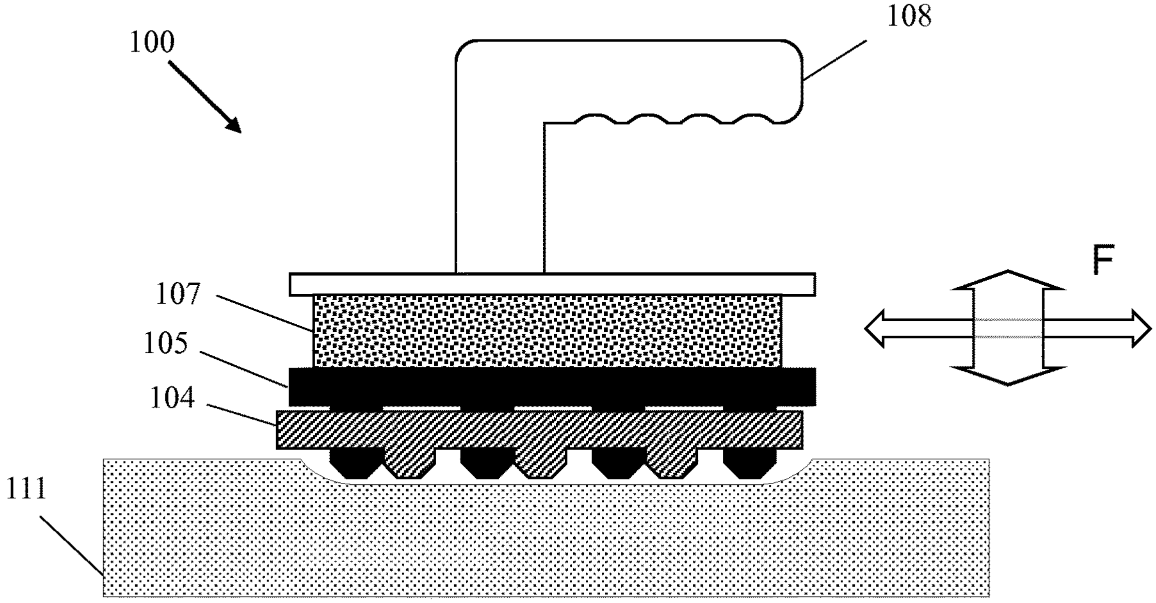
FIG. 13 illustrates a part of an embodiment of the massaging device
Figure 19:
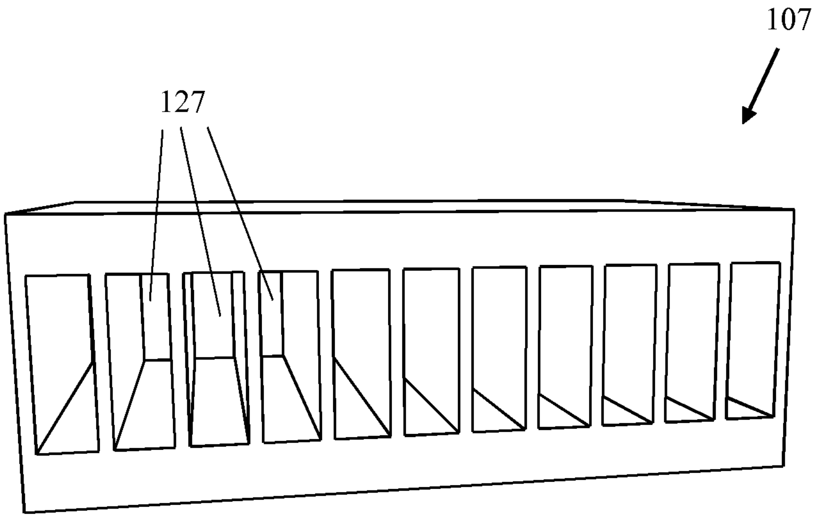
FIG. 19 illustrates an embodiment of a resilient material The drawings are only schematic and are non-limiting. In the drawings, the size of some of the elements may be exaggerated and not drawn on scale for illustrative purposes.

FIG. 13 illustrates a massaging device comprising a handle 108. The handle 108 is used to easily move the first 104 and the second plate 105 relative to each other after brining the massaging device in contact with the skin 111. The handle 108 is attached to the second plate 105. Optionally, in between the second plate 105 and the handle 108 a resilient material 107 is present. The resilient material 107 is flexible in one direction but resilient in other directions. The resilient material 107 may be placed such that it is flexible in the direction required to move the plates 104, 105 relative to each other. The resilient material may comprise leaf spring. The resilient material may comprise air compartments that are oriented perpendicular to the direction in which the resilient material is flexible, as illustrated in FIG. 19.

According to embodiment of the invention, the massaging device comprises a means for moving the plates 104, 105 relative to each other. This may be a motor. The motor may be coupled to the first plate 104 only. Alternatively, the motor may be coupled to the second plate 105 only. Alternatively, the motor may be coupled to the first 104 and the second plate 105.

According to a particular embodiment, the means for moving the plates 104, 105 relative to each other is coupled to one of the plates 104, 105 and is configured to drive one of the plates 104, 105 with an oscillating, angular motion. For example, in that embodiment, the plates 104, 105 are driven reciprocally over an angle of 15 degrees. In other words, the means for moving the plates 104, 105 is configured to actuate massaging elements such that they make an arcuate reciprocal motion through arcuate through-holes.

Figure 14:
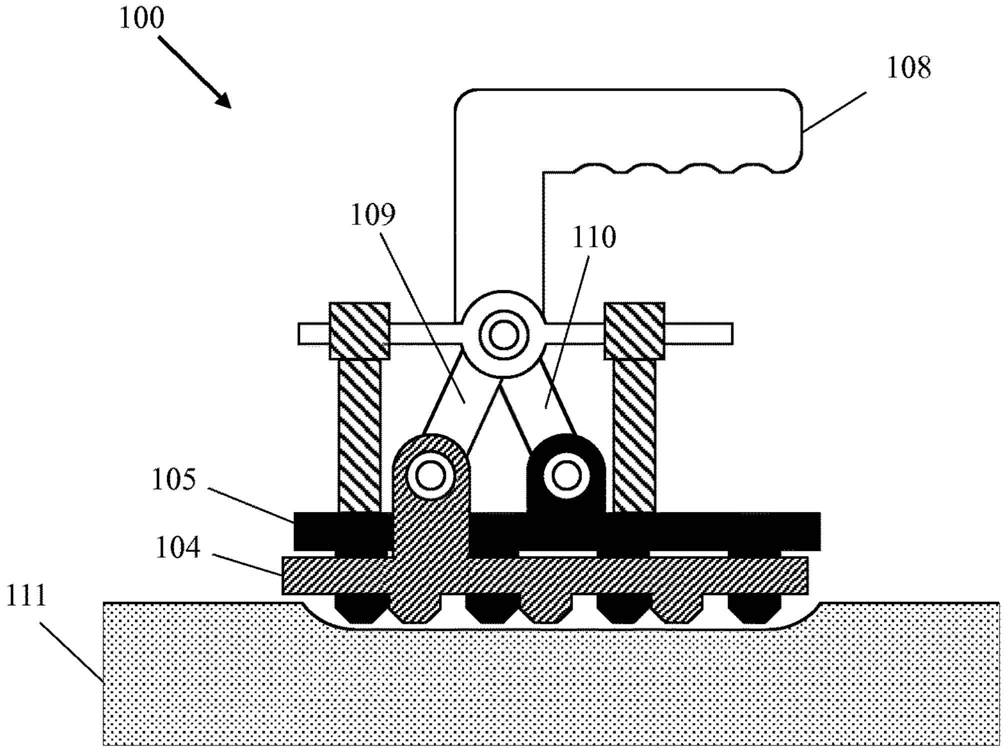
FIG. 14 illustrates a part of an embodiment of the massaging device

FIG. 14 illustrates a massaging device 100 comprising a means 108 for moving the first 104 and the second 105 plate relative to each other. The means is connected to the first plate 104 with a first mechanical linkage. The means is further connected to the second plate 105 with a second mechanical linkage. The oscillating or reciprocating motion of the two plates can cause a net-force load on the user. To minimize the load experience by the user, the means is balanced by being fixed to the half-way motion of the plates via the mechanical linkages thereby keeping it close to zero motion relative to the skin. Alternatively, this effect can also be achieved using one or more elastic elements.

Figure 15:
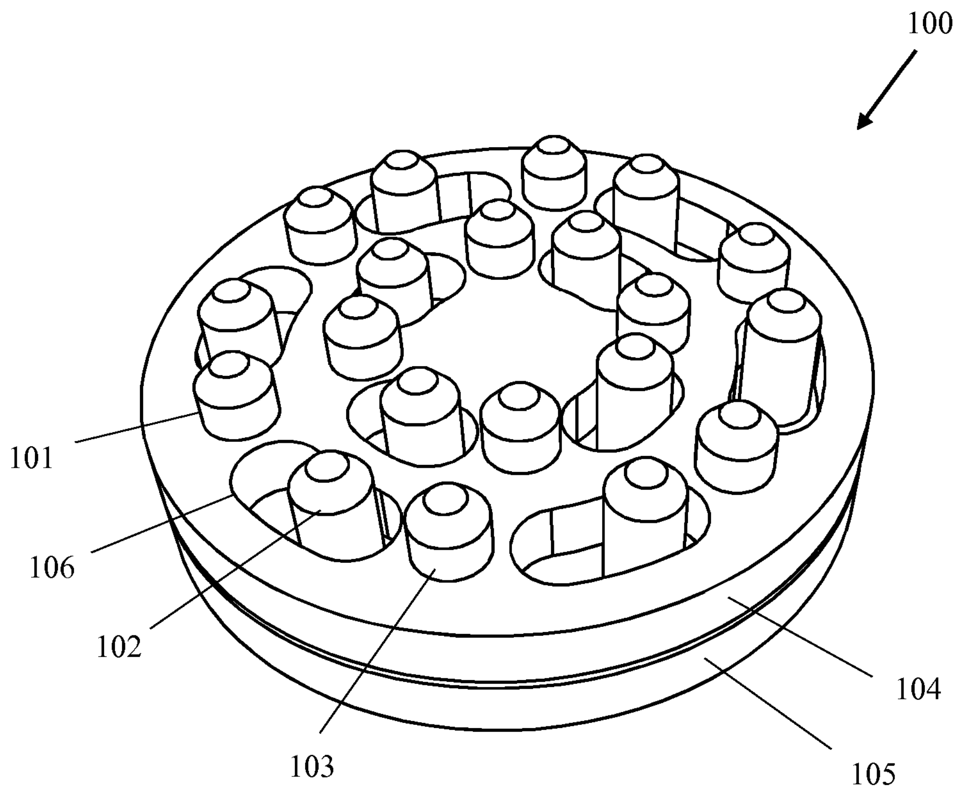
FIG. 15 illustrates an embodiment of the massaging device

FIG. 15 illustrates a massaging device 100 comprising a circular first plate 104 and a circular second plate 105 and a massaging surface comprised of massaging elements 101, 102, 103.

Figure 16:
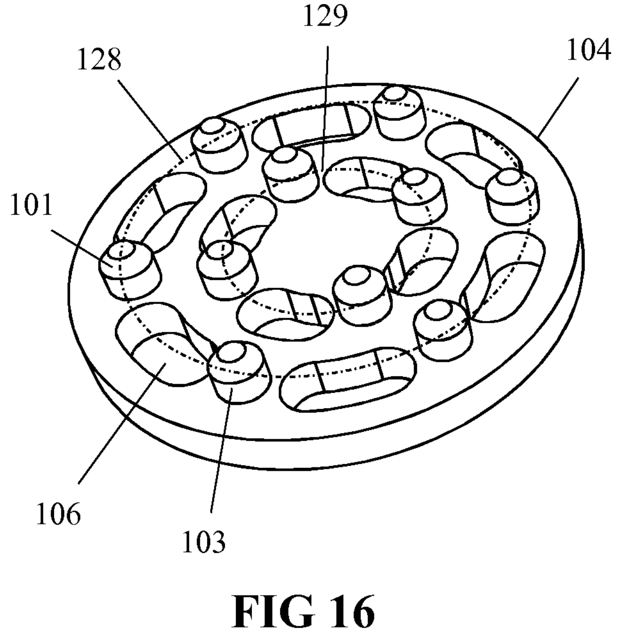
FIG. 16 illustrates a part of an embodiment of the massaging device

The first plate 104 is illustrated in FIG. 16 and comprises a plurality of massaging elements 101, 103, and a plurality of through-holes 106. The plate 104 features an outer circle 128 (imaginary indicated in FIG. 16 with a dashed line) formed of massaging elements 101, 103 and through-holes 106. In between all adjacent massaging elements 101, 103 along the circle a through-hole 106 is present in the plate 104. In other words, along the outer circle 128, adjacent to each massaging element a through-hole 106 is present in the plate 104. The plate 104 further features an inner circle 129 (imaginary indicated in FIG. 16 with a dashed line) formed of massaging elements and through-holes. Similar to the outer circle 128, in between adjacent massaging elements along the circle, a through-hole is present. In other words, along the inner circle 129, adjacent to each massaging element a through-hole is present. The through-holes 106 in the plate 104 have an arcuate shape to allow an arcuate motion of a massaging element in each through-hole. The inner and outer circles are concentric circles having a common center.

Figure 17:
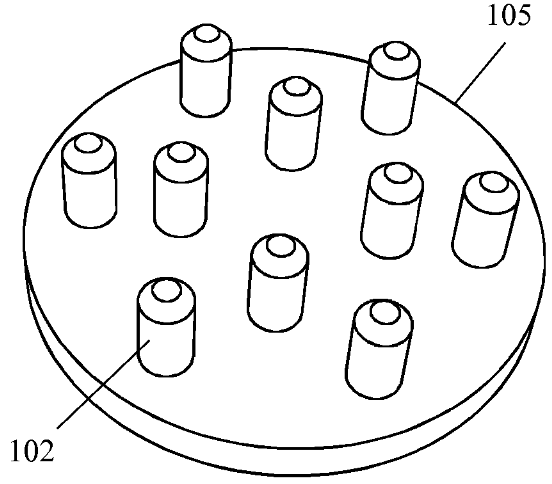
FIG. 17 illustrates a part of an embodiment of the massaging device

The second plate 105 is illustrated in FIG. 17 and comprises a plurality of massaging elements 102. The location of the massaging elements 102 are aligned with the location of the through-holes 106 in first plate 104. This allows the first plate 104 to be positioned on top of the second plate 105 whereby the massaging elements 102 of the second plate 105 fit through the through-holes 106 of the first plate. The fitted plates are illustrated in FIG. 15.

To create a massaging effect on the skin, the massaging elements 101, 102, 103 are applied to the skin. The plates 104, 105 are moved relative to each other by rotating one of the plate or by rotating both plates in opposite directions. By this rotational motion, the massaging elements of the second plate 105 fitting through the through-holes 106 move within the arcuate shaped through-holes 106. The rotational motion may comprise a continuously alternating clockwise/counter-clockwise motion. To generate this movement, an appropriate mechanical system may be coupled to, for example, a motor. The mechanical system may be adapted to translate the motion provided by the motor into a back and forth or into a continuously alternating clockwise/counter-clockwise motion.

According to an embodiment of the invention, the massaging device comprises a plurality of massaging elements, the elements being positioned in multiple concentric circles. Massaging elements within each circle move relative to each other thereby creating a massaging effect to the skin. The massaging elements are moved such that the net-result of forces exercised on the skin is substantially zero within each circle. This effect may be achieved by three consecutive massaging elements in a circle, wherein the middle one of the consecutive massaging elements moves relative to the other two massaging elements. Further, the massaging device may comprise three or more concentric circles with massaging elements. In these embodiments, each circle of massaging elements provides a massaging effect to the skin.

Further, the massaging device may comprise two or more sets of concentric circles of massaging elements wherein the center of each set is at a different location. Each set may be driven by a different motor or a mechanical system may be added that translates the motion of a single motor differently to different sets.

While the massaging elements and through-holes are throughout the description described as forming a circular shape, the position of the elements and the through-holes may deviate from that circular shape.

In embodiments of the invention, the massaging elements 101, 103 and through-holes 106 may be positioned in different concentric circles in or on the plate 104. The plate 104 may comprise a first circle formed by massaging elements 101, 103. For example, a first circle being formed only by massaging elements 101, 103. The plate 104 may further comprise a second circle formed by through-holes 106. For example, a second circle being formed only by through-holes 106. The plate 104 may comprise a plurality of concentric circles, the circles alternating between a circle formed by massaging elements 101, 103 and a circle formed by through-holes 106. The massaging elements 102 of the second plate 105 are aligned with the position of the through-holes 106 in the first plate 104.

Figure 18:
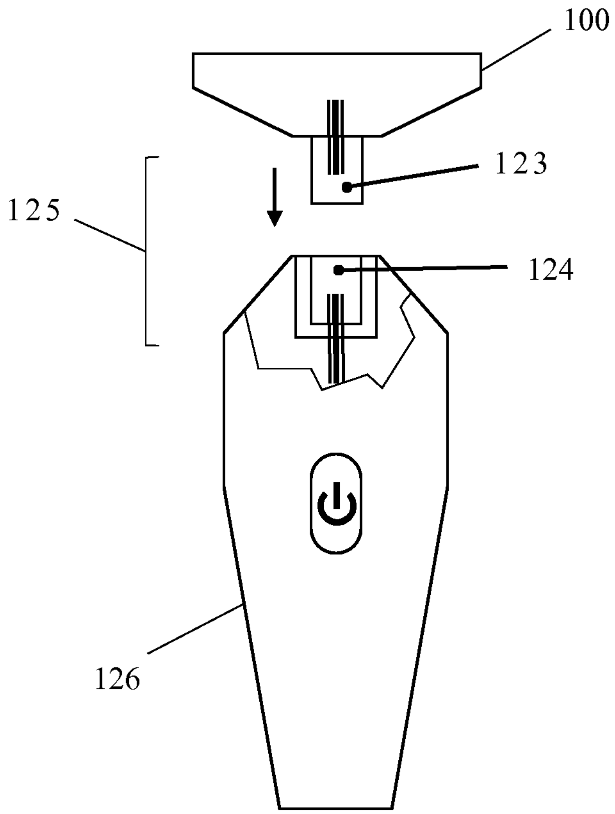
FIG. 18 illustrates an embodiment of a massaging device which can be received by or attached to a hand-held device

FIG. 18 illustrates the attachment of a massaging device 100 to a personal health or hand-held device 126. The massaging device 100 comprises a connector 123 which can be received by a receptacle 124 which is part of the hand-held device 126. The connector 123 and receptacle 124 may be based on a mechanical click-on principle. This allows the user to easily replace the massaging device 100. A mechanical system 125, e.g. mechanical driving interface connection, is present which translates the motion of a motor present in the handheld device 126 into an appropriate motion, e.g. a rotational motion, to drive the massaging elements of the massaging device 100. The mechanical system 125 may be part of the massaging device 100 or may be part of the hand-held device 126.

FIG. 19 illustrates an embodiment of a resilient material 107 which is flexible in a first direction and resilient in a second direction. The direction in which the resilient material 107 is flexible may be the same direction in which the plates are moveable relative to each other. In a particular embodiment the material comprises air compartments 127 oriented perpendicular to the first direction.

The dimensions of the massaging device may be adapted to the particular application of the massaging device. For example, the massaging surface area of the massaging device for massaging the skin of the face may be a few $cm^2$, for example between 1 and 10 $cm^2$. For example, the massaging surface area of the massaging device for massaging other parts of the body may be tens of $cm^2$, for example between 10 and 100 $cm^2$. For example, the massaging surface area of the massaging device for massaging the scalp may be between 10 and 250 $cm^2$.

The invention claimed is:

1. A massaging device having a massaging surface, the massaging device comprising a plurality of massaging elements moveable relative to each other, wherein:

a first plurality of massaging elements are fixed on a first plate, wherein a second plurality of massaging elements are fixed on a second plate, wherein the first plate is positioned on top of the second plate, wherein each individual one of the second plurality of massaging elements individually protrudes through the first plate via an individual one of a plurality of arcuate shaped through-holes present in the first plate, each of the plurality of arcuate shaped through-holes being located in between a respective circumferentially positioned first and second one of the first plurality of massaging elements, wherein the first plate is moveable relative to the second plate, or wherein the second plate is moveable relative to the first plate, each individual one of the second plurality of massaging elements is configured to move in an arcuate path within the corresponding individual one of the plurality of arcuate shaped through-holes between a first position at a first end of the individual one of the plurality of arcuate shaped through-holes and a second position at a second end of the individual one of the plurality of arcuate shaped through-holes, as the first plate is moved relative to the second plate, or the second plate is moved relative to the first plate, and wherein:

the massaging surface is adapted such that applying the massaging surface to a skin surface and moving each individual one of the second plurality of massaging elements, within the arcuate shaped through-hole, between the first position and the second position causes two differently directed forces to be simultaneously exercised by the massaging elements, the two differently directed forces thereby causing simultaneous:

pinching of a skin region between the first one of the first plurality of massaging elements and an individual one of the second plurality of massaging elements, and stretching of a skin region between the second one of the first plurality of massaging elements and the individual one of the second plurality of massaging elements.

2. The massaging device, according to claim 1, wherein a net-result of the two differently directed forces configured to be exercised on the skin surface is about zero.

3. The massaging device according to claim 1, wherein the first plate is rotationally moveable relative to the second plate.

4. The massaging device according to claim 1, wherein the first or the second plate is fixed within the massaging device.

5. The massaging device according to claim 1, wherein the first and the second plate are moveable within the massaging device.

6. The massaging device according to claim 1, further comprising a means for moving the plurality of massaging elements relative to each other.

7. The massaging device according to claim 6, wherein the means for moving the plurality of massaging element relative to each other is a motor.

8. The massaging device according to claim 6, wherein the plurality of massaging elements are configured to move relative to each other via a resilient material, the resilient material being flexible in one direction and resilient in other directions.

9. The massaging device according to claim 6, wherein the plurality of massaging elements are configured to move relative to each other via mechanical linkages such that a net-force for moving the plurality of massaging elements relative to each other is reduced when actuating the massaging device.

10. The massaging device according to claim 1, wherein at least a part of the plurality of massaging elements is individually displaceable.

11. A hand-held personal care device, comprising a massaging device according to claim 1.

12. The massaging device according to claim 1, wherein a height of the second plurality of massaging elements on the second plate is a sum of a thickness of the first plate and a height of the first plurality of massaging elements of the first plate.

13. The massaging device of claim 1, wherein a first one of the second plurality of massaging elements is configured to be moved between the first and second positions by a first motor, and a second one of the second plurality of massaging elements is configured to be moved between the first and second positions by a second motor.

14. A massaging device having a massaging surface comprising a plurality of massaging elements moveable relative to each other, wherein:

a first plurality of massaging element are fixed on a first plate, wherein a second plurality of massaging elements are fixed on a second plate, wherein the first plate is positioned on top of the second plate, wherein each individual one of the second plurality of massaging elements individually protrudes through the first plate via an individual one of a plurality of arcuate shaped through-holes present in the first plate, each of the plurality of arcuate shaped through-holes being located in between a respective circumferentially positioned first and second one of the first plurality of massaging elements, wherein the first plate is moveable relative to the second plate, or wherein the second plate is moveable relative to the first plate, wherein each of the second plurality of massaging elements moves away from the respective first massaging element of the first plurality of massaging elements and approaches the second massaging element of the first plurality of massaging elements, each individual one of the second plurality of massaging elements is configured to move in an arcuate path within the corresponding individual one of the plurality of arcuate shaped through-holes between a first position at a first end of the individual one of the plurality of arcuate shaped through-holes and a second position at a second end of the individual one of the plurality of arcuate shaped through-holes, as the first plate is moved relative to the second plate, or the second plate is moved relative to the first plate, and wherein:

the massaging surface is adapted such that applying the massaging surface to a skin surface and moving each individual one of the second plurality of massaging elements between the first position and the second position causes two differently directed forces to be simultaneously exercised by the massaging elements, the two differently directed forces thereby causing simultaneous:

pinching of a skin region between the first one of the first plurality of massaging elements and an individual one of the second plurality of massaging elements, and stretching of a skin region between the second one of the first plurality of massaging elements and the individual one of the second plurality of massaging elements.

15. The massaging device, according to claim 14, wherein a net-result of the two differently directed forces configured to be exercised on the skin surface is about zero.

16. The massaging device according to claim 14, wherein the first plate is rotationally moveable relative to the second plate.

17. The massaging device according to claim 14, wherein the first or the second plate is fixed within the massaging device.

18. The massaging device according to claim 14, wherein the first and the second plate are moveable within the massaging device.

19. A hand-held personal care device, comprising a massaging device according to claim 14.

20. The massaging device according to claim 14, wherein a height of the second plurality of massaging elements on the second plate is a sum of a thickness of the first plate and a height of the first plurality of massaging elements of the first plate.

* * * * *